United States Patent Office 3,594,409
Patented July 20, 1971

3,594,409
MAGNESIUM SALTS OF SUCCINIC ACID ESTERS
Felix Lachampt, Franconville, Andre Viout, Paris, and Guy Vanlerberghe, Mitry-Mory, France, assignors to Societe Anonyme dite: L'Oreal, Paris, France
No Drawing. Continuation-in-part of application Ser. No. 491,439, Sept. 29, 1965, now Patent No. 3,419,665. Divided and this application Mar. 4, 1968, Ser. No. 709,904
Claims priority, application France, Oct. 5, 1964, 990,354
Int. Cl. C07c 69/40
U.S. Cl. 260—485
7 Claims

ABSTRACT OF THE DISCLOSURE

Emulsifier compounds which are magnesium salts of a succinic ester of a polyoxyalkylene fatty alcohol having the formula:

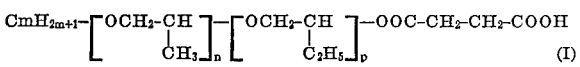

in which:
  $m$ is an integer between 12 and 28 inclusive,
  $n$ and $p$ are numbers lying between 0 and 12 inclusive, while the sum of $n$ and $p$ falls between 2 and 12 inclusive, which produce unusually stable water in oil emulsions.

---

This application is a continuation-in-part of U.S. application Ser. No. 491,439, filed Sept. 29, 1965, now U.S. Patent No. 3,419,665.

It is well known that many cosmetics are made from water-in-oil emulsions. However, such emulsions, which must be stable, irreversible, and preferably fluid, are very difficult to prepare in the present state of the art.

In fact most of the emulsions now known permit some of the oil to escape within a relatively short time. Moreover, it frequently happens that an emulsion which is initially of the water-in-oil type is spontaneously transformed into the oil-in-water type when an excess of water is added.

The present invention is based on the discovery of new emulsifiers which make it possible to prepare stable irreversible emulsions of the water-in-oil type. These emulsions are very fluid most of the time.

Moreover, the emulsions obtained in accordance with the present invention are especially valuable when used in the cosmetic field, since they are very effective in moisturizing the lipidoproteidic complex which constitutes the outer layer of the skin and thus preventing dryness thereof.

This remarkable property of cosmetic emulsions of this invention appears to result not only from the particles of water which are retained by the continuous oil phase, but also from the fact that the products making up the emulsions according to the invention contain a considerable amount of combined water.

This particularly advantageous characteristic of emulsions of the invention is evidenced by the fact that, when spread out in a thin layer, they dry up very slowly, even when placed in a relatively dry atmosphere.

Moreover, the emulsions of this invention have the important advantage of facilitating the penetration of the products forming the emulsion into the skin.

One object of the present invention is to provide new emulsifiers which form very desirable emulsions of the water-in-oil type, the emulsifier compounds of this invention are magnesium salts of a succinic ester of a polyoxyalkylene fatty alcohol having the formula:

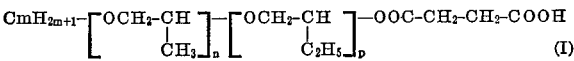

in which:
  $m$ is an integer between 12 and 28; but preferably between 12 and 18;
  $n$ and $p$ are numbers lying between 0 and 12 inclusive, while the sum of $n$ and $p$ falls between 2 and 12 inclusive.

The details relating to forming a water-in-oil emulsions or water and oil emulsions using the emulsifiers of the present invention are given in the parent application U.S. Ser. No. 491,439 mentioned above. The disclosure of the parent application is incorporated by reference in this application, especially the portion relating to the method of forming the emulsions with the new compounds.

To prepare the magnesium salts of the succinic monoesters defined in Formula I and the following preferred procedure may be followed:

A fatty alcohol obtained from a vegetable oil, having 12 to 28 or more carbon atoms but preferably 12 to 18 carbon atoms is reacted with propylene oxide or butylene oxide or a mixture thereof in the presence of an alkaline catalyst, such as sodium or sodium methylate, for example, in the ratio of about 0.1 to 0.5% of sodium in proportion to the fatty alcohol.

Any known catalyst may be used. The reaction is preferably carried out in an autoclave under pressure, at a temperature between 100 and 150° C., although temperatures up to approximately 180° C. may be used. It may also be carried out in the laboratory, utilizing the following apparatus. A flask provided with mechanical agitating means, a thermometer, and two vertical condensers, one communicating with the atmosphere, and the other surmounted by a dropping funnel into which the compounds to be condensed are introduced, means for circulating a refrigerating brine, means for introducing nitrogen at the top of the funnel and withdrawing it at the bottom thereof, heating means, e.g. an electrically heated water-bath.

The resulting product is then washed with an aqueous solution containing 10 to 20% methanol, ethanol or other dilute alcohol aqueous solution.

The polyoxyalkylene fatty alcohols are then esterified with succinic anhydride in the presence of an esterification catalyst, such as pyridine at a preferred temperature of about 90 to 100° C. Note that other illustrative examples of esterification catalysts are diameter, N-N'tetramethylethylene diamine, N-N' tetramethyl-diamine 1,3 butane etc.

The preferred temperature of this esterification is 90 to 100° C.; below that the speed of reaction is slower. A temperature of 80 to 150° C. could be used. Above 150° C. one risks the formation of diesters.

The esterification takes about 3 hours.

The preferred proportions in the starting composition are 1 mol of polyoxyalkylene alcohol, 1.10 mols of succinic anhydride, 2 mols of pyridine. With these proportions a practically complete esterification is obtained. It is evident that the esterification will be also complete if one augments the quantity of succinic anhydride or the catalyser, but this augmentation is not practical.

In order to prepare the magnesium salt of the ester produced in this manner, the succinic monoester in question is neutralized with a stoichiometric quantity of neutralizer, such as KOH or NaOH at 40% concentrations in the presence of enough water to produce an isotropic solution at a concentration of N/3 at the end of the process. This neutralization is preferably carried out while the composition is vigorously agitated at a preferred temperature of about 80 to 95° C. In a double decomposition reaction such as this to obtain the magnesium salt, we salify the acid function with potash or soda, in order to easily displace the sodium or potassium by the magnesium.

But we obtain the optimum results, that is to say highest magnesium salt yield, at 80° C. The magnesium salt is precipitated at once, using an excess of magnesium chloride in solution. Two successive washings will then suffice to obtain the desired magnesium salt.

The water-in-oil emulsions formed by using the emulsifiers of this invention are unusually stable and they are very effective for use in moisturizing the outer layer of skin.

The emulsions of this invention are particularly useful in preparing foundation creams, make-up or hand creams. The make-up creams are especially resistant to the action of water and may be removed only by cleansing creams or lotions.

Titanium oxide and pigments, when well dispersed in these emulsions, penetrate remarkably and cover the skin without giving a caked effect. An unusually large quantity of titanium oxide can be included in the hand cream using these emulsifiers.

The fact that the emulsifiers of this invention are completely harmless and very penetrating make them excellent medical excipients.

PREPARATION OF STEARYL ALCOHOL DERIVATIVES

The stearyl alcohol used as a raw material is a commercially available product having the following analysis:

Hydroxyl index—95
Saponification Index—2.7
Iodine index—1
Melting point—158° C.

Example 1

2.3 kg. of stearyl alcohol is introduced into a six-liter flask equipped as described above, 11.5 g. of sodium is dissolved therein; and the mixture is heated to 150° C. under a nitrogen atmosphere. 1.95 kg. of propylene oxide is added, drop by drop. After 7 hours of reaction 1.8 kg. of the oxide has condensed. The catalyst is neutralized with 70 ml. of concentrated hydrochloric acid. After washing, vacuum drying, and filtration, the yield is 4 kg. of polyoxypropyl stearyl alcohol, having a hydroxyl index of 112, which corresponds to an average molecular weight of 500. This product is completely liquid at 26° C. and represented by the formula:

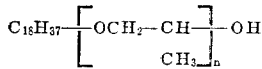

in which $n$ has an average value of about 4.

Example 2

200 g. of polyoxypropyl stearyl alcohol from Example 1 is reacted at 150° C. with 59 g. of propylene oxide in the presence of 1 g. of sodium as a catalyst. At the end of an hour and a half 53 grams of epoxide are condensed. At this stage 80 grams of the mixture are withdrawn and neutralized with 1.5 ml. of concentrated hydrochloric acid. After washing, vacuum drying, and filtration 75 g. of polyoxypropyl stearyl alcohol is recovered. This is completely liquid at 190° C. and has a hydroxyl index of 91, which corresponds to a compound having the formula:

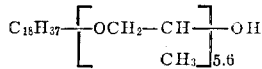

Example 3

175 grams of the crude product remaining after the foregoing operation are condensed with 35 g. of propylene oxide in the presence of 0.7 g. of sodium as a catalyst.

At the end of an hour and 10 minutes a test for the alcoholic content indicates that 33.5 g. of propylene oxide have been condensed.

80 grams of the mixture are then withdrawn, and treated as before.

This yields 73 g. of polyoxypropyl stearyl alcohol, the terminal melting point of which is 14° C. and the hydroxyl index of which is 83. This corresponds to a compound having the formula:

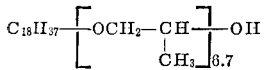

Example 4

126.5 grams of the crude product remaining after the foregoing operation is mixed with 22 g. of propylene oxide, in the presence of 0.43 g. of sodium as a catalyst.

After reacting for an hour at 150°–160° C., 19.5 g. of propylene oxide are condensed.

80 grams of this mixture are withdrawn and treated as before, yielding 70 g. of a product having a final melting point of 9° C. and a hydroxyl index of 72, which corresponds to a polyoxypropyl stearyl alcohol having the formula:

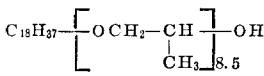

Example 5

65 grams of the crude product resulting from the foregoing condensation is mixed with 10 g. of propylene in the presence of 0.2 g. of sodium as a catalyst.

After reacting for an hour at 150°–160° C., 8 g. of oxide are condensed.

The catalyst is neutralized with 1 ml. of concentrated hydrochloric acid, washed 5 times with 100 ml. of sodium sulfate in 10% aqueous solution, vacuum dried, and filtered.

The yield is 64 g. of a product having a final melting point of 6° C. and a hydroxyl index of 66, which corresponds to a polyoxypropyl stearyl alcohol having the formula:

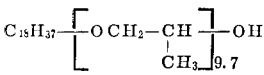

Example 6

144 g. of stearyl alcohol, 0.75 g. of powdered sodium methylate, and 158 g. of butylene oxide are introduced into a steel cylinder, which is agitated by swinging it.

The apparatus is purged with nitrogen and the mixture is heated to 130°–140° C. for 15 hours.

The crude product is cooled and transferred to a flask provided with mechanical agitating means. 19 grams of volatile products are eliminated by heating it in a water bath under a vacuum maintained by a water-jet pump. The catalyst is neutralized with 3 ml of concentrated hydrochloric acid, and washed three times;

first, with 50 ml. of methanol and 50 ml. of water heated to 60° C.;

second, with 100 ml. of methanol and 500 ml. of water heated to 50° C.;

third, with 500 ml. of water at 60° C.

After decantation the organic phase is vacuum dried. The yield is 273 grams of polyoxybutyl stearyl alcohol, the final melting point of which is 18° C., and the hydroxyl index of which is 112, which corresponds to a compound having the formula:

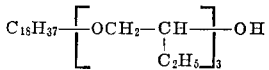

(B) DERIVATIVES OF LAURIC ALCOHOL

Example 7

4 g. of sodium is dissolved in 816 g. of commercial lauric alcohol (LOROL) having a hydroxyl index of 275.

The mixture is heated to 150° C. under a nitrogen atmosphere and 510 g. of propylene oxide is introduced drop by drop. At the end of 105 minutes of reaction at 150° C., 500 g. of propylene oxide are condensed.

The crude product is treated as before:

The catalyst is neutralized.
It is washed.
It is vacuum dried.
It is filtered.
Yield: 1288 g.

The product obtained is represented by the formula:

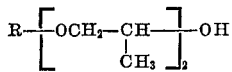

in which R indicates a lauryl radical.

EXAMPLE OF PREPARATION OF SUCCINIC ESTERS

Example 8

3.5 kg. (7 mols) of polypropylene stearyl alcohol according to Example 1 is mixed, under agitation, with 770 g. (7.7 mols) of succinic anhydride and 1100 g. of pyridine.

The mixture is heated in a boiling water bath for three hours.

The reaction mixture is then washed several times at a temperature of 50–60° C.

(1) With a hydrochloric acid solution obtained by diluting 1 kg. of concentrated hydrochloric acid in 10 kg. of water.
(2) With a hydrochloric acid solution obtained by diluting 500 ml. of concentrated acid in 10 l. of water.
(3) With a solution obtained by diluting 125 ml. of concentrated hydrochloric acid in 5 l. of water.

In order to facilitate decantation, during this last washing 2 l. of a 10% sodium sulfate solution are added.

(4) With a 10% sodium sulfate solution (three washings with 5 l. of solution each time).

After decantation, the product is vacuum dried by heating it on a boiling water-bath.

4.07 kg. of the acid ester is recovered and filtered on fritted glass. The final yield is 3.97 kg.

The succinic semi-ester thus obtained may be represented by the formula:

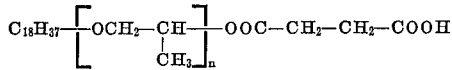

in which $n$ has an average value of about 4.

It has the following characteristics:

Acid index—90
Saponification index—17.9
Final melting point—30° C.

When the same process is applied to the derivatives of stearyl alcohol described in Examples 2, 3, 5 and 6, a series of succinic semi-esters is obtained which have the characteristics set forth in the following table:

| Formula of the compound | Acid index | Saponification index | Melting point, ° C. |
|---|---|---|---|
| $C_{18}H_{37}\text{—}[\text{OCH}_2\text{—CH(CH}_3\text{)}]_{5.6}\text{—O—C(O)—CH}_2\text{—CH}_2\text{—COOH}$ | 73 | 149 | 22 |
| $C_{18}H_{37}\text{—}[\text{OCH}_2\text{—CH(CH}_3\text{)}]_{6.7}\text{—O—C(O)—CH}_2\text{—CH}_2\text{—COOH}$ | 63 | 128 | 15 |
| $C_{18}H_{37}\text{—}[\text{OCH}_2\text{—CH(CH}_3\text{)}]_{9.7}\text{—O—C(O)—CH}_2\text{—CH}_2\text{—COOH}$ | 46 | 91 | 8 |
| $C_{18}H_{37}\text{—}[\text{OCH}_2\text{—CH(C}_2\text{H}_5\text{)}]_{3}\text{—O—C(O)—CH}_2\text{—CH}_2\text{—COOH}$ | 86 | 171 | 19–20 |

Example 9

Preparation of a magnesium salt of the compound having the formula:

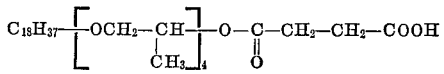

About 300 ml. of water and 60 g. of the above compound (acid index=90) are introduced into a 600 ml. beaker and heated to about 80° C. while agitating it with a Moritz. A stoichiometric quantity of potassium hydroxide (13.6 g. of a 40% potassium hydroxide solution) is poured in. The result is an isotropic solution at a concentration of about N/3. As the consequence of a slight (1 to 2%) excess of magnesium chloride in solution, the magnesium salt of the compound is precipitated, i.e., 10 g. of $MgCl_2 6H_2O$. The product decants rapidly. The waters are drawn off and the residue washed three times with 300 ml. of boiling water. The result is the magnesium salt, in a form which crystallized at 20° C. and contains about 60% water.

In order to determine whether the Mg has reacted, the Mg ion content of the wash waters is measured. It is found that 96% of the Mg has reacted.

The magnesium salt of the compound is dried and when dried is a crystalline paste having a melting point of 40°.

When packed at a relative humidity of 90°, the dry product swells and retains 10.5 molecules of water per hydrocarbon chain.

In order that the method of using the compounds of this invention may be clearly understood, several exemplary methods of carrying it out will now be described, purely by way of illustration. The compositions described in these examples are in each case obtained by preparing the emulsion in the manner hereinbefore described.

Example 10

A moisturizing lotion may be prepared in accordance with the invention, having the following composition:

Magnesium salt of a composition having the following formula:

|  | Grams |
|---|---|
| $C_{18}H_{37}\text{—}[\text{OCH}_2\text{—CH(CH}_3\text{)}]_{5.6}\text{—O—C(O)—CH}_2\text{CH}_2\text{—COOH}$ | 25 |
| Paraffin oil | 25 |
| Perfume | 0.2 |
| Water | 49.8 |

Example 12

A moisturizing cream may be prepared having the following composition:

Magnesium salt of a composition having the following formula:

|  | Grams |
|---|---|
| $C_{12}H_{25}\text{---}\left[\text{---OCH}_2\text{---CH}(\text{CH}_3)\text{---}\right]_2\text{---O---C(=O)---CH}_2\text{CH}_2\text{---COOH}$ | 15 |

| | |
|---|---|
| Paraffin oil | 25 |
| Total fatty alcohols from beeswax | 8 |
| Microcrystalline wax | 5 |
| Perfume | 0.2 |
| Water | 46.8 |

Example 13

A foundation cream having the following composition may be prepared:

Magnesium salt of a composition having the following formula:

|  | Grams |
|---|---|
| $C_{18}H_{37}\text{---}\left[\text{---OCH}_2\text{---CH}(\text{CH}_3)\text{---}\right]_4\text{---O---C(=O)---CH}_2\text{CH}_2\text{---COOH}$ | 13 |

| | |
|---|---|
| Paraffin oil | 10 |
| Isopropyl myristate | 10 |
| Microcrystalline wax | 2 |
| Titanium oxide | 2 |
| Ochers | 1.5 |
| Perfume | 0.25 |
| Water | 61.25 |

Example 14

A hand cream may be prepared having the following composition:

Magnesium salt of a composition having the following formula:

|  | Grams |
|---|---|
| $C_{18}H_{37}\text{---}\left[\text{---OCH}_2\text{---CH}(\text{CH}_3)\text{---}\right]_n\text{---}\left[\text{---OCH}_2\text{---CH}(\text{C}_2\text{H}_5)\text{---}\right]_p\text{---O---C(=O)---CH}_2\text{CH}_2\text{COOH}$ | 25 | in which $n$ is an integer adjacent to $p$ and $n+p=3$.

| | |
|---|---|
| Cetyl alcohol | 3 |
| Isopropyl palmitate | 8 |
| Petrolatum | 11 |
| Microcrystalline wax | 0.5 |
| Titanium oxide | 5 |
| Perfume | 0.2 |
| Water | 47.3 |

Example 15

A make-up for the cheeks may be prepared having the following composition:

Magnesium salt of a composition having the following formula:

|  | Grams |
|---|---|
| $C_{18}H_{37}\text{---}\left[\text{---OCH}_2\text{---CH}(\text{CH}_3)\text{---}\right]_4\text{---O---C(=O)---CH}_2\text{CH}_2\text{---COOH}$ | 10 |

Magnesium salt of a composition having the following formula:

|  | Grams |
|---|---|
| $C_{18}H_{37}\text{---}\left[\text{---OCH}_2\text{---CH}(\text{CH}_3)\text{---}\right]_{9.7}\text{---O---C(=O)---CH}_2\text{CH}_2\text{---COOH}$ | 10 |

| | |
|---|---|
| Isopropyl myristate | 8 |
| Petrolatum | 12 |
| Microcrystalline wax | 4 |
| Pigments | 2 |
| Perfume | 0.2 |
| Water | 53.8 |

Example 16

A brilliantine for men having the following composition may be prepared:

Magnesium salt of a composition having the following formula:

|  | Grams |
|---|---|
| $C_{18}H_{37}\text{---}\left[\text{---OCH}_2\text{---CH}(\text{CH}_3)\text{---}\right]_4\text{---O---C(=O)---CH}_2\text{CH}_2\text{---COOH}$ | 10.6 |

| | |
|---|---|
| Paraffin oil | 18 |
| Lanolin | 3.3 |
| Microcrystalline wax | 2 |
| Perfume | 0.2 |
| Water | 65.9 |

This cream leaves no whitish residue after application and keeps the hair in place while imparting a sheen to it.

Example 17

A cream for treating burns may be prepared, having a composition which will be given below. This example is given only to show that the emulsions according to the invention are suitable for use as pharmaceutical excipients. It is not an object of the invention to provide a product which is new from the pharmaceutical point of view, since the use of calophyllum oil in treating burns is well known.

Magnesium salt having the following formula:

|  | Grams |
|---|---|
| $C_{18}H_{37}\text{---}\left[\text{---OCH}_2\text{---CH}(\text{CH}_3)\text{---}\right]_{6.7}\text{---O---C(=O)---CH}_2\text{CH}_2\text{---COOH}$ | 20 |

| | |
|---|---|
| Perhydrosqualene | 17 |
| Magnesium stearate | 3 |
| Calophyllum oil | 2 |
| Water | 58 |

Example 18

A cuticle cream having the following composition may be prepared:

Magnesium salt of a composition having the formula:

$$C_{18}H_{37}\text{---}\left[\text{---}OCH_2\text{---}\underset{\underset{C_2H_5}{|}}{CH}\text{---}\right]_3\text{---}O\text{---}\underset{\underset{O}{\|}}{C}\text{---}CH_2CH_2\text{---}COOH$$

| | Grams |
|---|---|
| | 19 |
| Paraffin oil | 18 |
| Sweet almond oil | 2 |
| Magnesium stearate | 10 |
| Perfume | 0.2 |
| Water | 50.8 |

The emulsions described in the foregoing examples are of the water-in-oil type, are quite stable, and do not tend to change to emulsions of the oil-in-water type when an excess of water is added.

All of these emulsions make it possible to moisturize the outer layer of the skin most efficaciously.

Example 19

A hand cream may be prepared having the following composition:

Magnesium salt of a composition having the formula:

$$C_{18}H_{37}\text{---}\left[\text{---}OCH_2\text{---}\underset{\underset{CH_3}{|}}{CH}\text{---}\right]_n\left[\text{---}OCH_2\text{---}\underset{\underset{C_2H_5}{|}}{CH}\text{---}\right]_p\text{---}O\text{---}\underset{\underset{O}{\|}}{C}\text{---}CH_2CH_2COOH$$

in which $n$ is an integer adjacent to $p$ and $n+p=3$.

| | Grams |
|---|---|
| | 25 |
| Cetyl alcohol | 3 |
| Isopropyl palmitate | 8 |
| Petrolatum | 10 |
| Silicone oil SI 200 | 1 |
| Microcrystalline wax | 0.5 |
| Titanium oxide | 5 |
| Perfume | 0.2 |
| Water | 47.3 |

Example 20

A brilliantine for men having the following composition may be prepared:

Magnesium salt of a composition having the following formula:

$$C_{18}H_{37}\text{---}\left[\text{---}OCH_2\text{---}\underset{\underset{CH_3}{|}}{CH}\text{---}\right]_4\text{---}O\text{---}\underset{\underset{O}{\|}}{C}\text{---}CH_2CH_2\text{---}COOH$$

| | Grams |
|---|---|
| | 10 |
| Paraffin oil | 16 |
| Silicone oil SI 2050 | 2 |
| Lanolin | 3.3 |
| Microcrystalline wax | 2 |
| Perfume | 0.2 |
| Water | 65.9 |

This cream leaves no whitish residue after application and keeps the hair in place while imparting a sheen to it.

Example 21

A moisturizing cream may be prepared having the following composition:

Magnesium salt of a composition having the following formula:

$$C_{12}H_{25}\text{---}\left[\text{---}OCH_2\text{---}\underset{\underset{CH_3}{|}}{CH}\text{---}\right]_2\text{---}O\text{---}\underset{\underset{O}{\|}}{C}\text{---}CH_2CH_2\text{---}COOH$$

| | Grams |
|---|---|
| | 15 |
| Paraffin oil | 24.5 |
| Silicone oil SI 555 | 0.5 |
| Total fatty alcohols from beeswax | 5 |
| Microcrystalline wax | 0.2 |
| Water | 46.8 |

The silicone oils SI 555, SI 200 and SI 2050 are sold by Ste. Industrielle des Silicones. They are dimethylpolysiloxane of the type $(CH_3)_3SiO[(CH_3)_2SiO]_nSi(CH_3)_3$. These silicones are linear polymers with varying degrees of polymerization and with the two ends of the long polymer chain rounded off with $(CH_3)_3SiO$-groups to prevent further polymerization. These compounds are formed by hydrolysis of a mixture of dialkyl-dichlorosilanes and trialkyl-monochlorosilanes. The viscosity of the linear polymers depends upon the value of $n$ in the above formula; in the very viscous liquid silicones of this type $n$ may have a value as high as 2,000. The fluids are remarkably stable; they do not become rancid on storage and are not oxidized by heating in air to 150° C. They will however burn when ignited but the flash points are high—generally above 600° F. They are attacked by strong acids and alkalis. These silicone oils are known to those skilled in the art of cosmetics.

It will be appreciated that the methods of carrying out the invention which have been described have been given purely by way of example and may be modified as to detail without thereby departing from the basic principles of the invention.

What is claimed is:

1. An emulsifier which is a magnesium salt of a succinic ester of a polyoxyalkylene fatty alcohol having the formula:

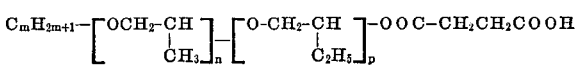

in which $m$ is an integer between 12 and 28 inclusive, $n$ and $p$ are numbers between 0 and 12 inclusive and the sum of $n$ and $p$ is between 2 and 12 inclusive.

2. An emulsifier as claimed in claim 1 in which $m$ is a number between 12 and 18 inclusive.

3. An emulsifier as claimed in claim 1, which is a magnesium salt of a succinic ester of a polyoxyalkylene lauryl alcohol.

4. An emulsifier as claimed in claim 1, which is a magnesium salt of a succinic ester of a polyoxyalkylene stearyl alcohol.

5. An emulsifier as claimed in claim 1, in which the polyoxyalkylene fatty alcohol is a polyoxypropylene-polyoxybutylene fatty alcohol.

6. An emulsifier as claimed in claim 1, in which the polyoxyalkylene fatty alcohol is a polyoxypropylene fatty alcohol.

7. An emulsifier as claimed in claim 1, in which the polyoxyalkylene fatty alcohol is a polyoxybutylene fatty alcohol.

References Cited
UNITED STATES PATENTS

| | | | |
|---|---|---|---|
| 2,950,299 | 8/1960 | Kirkpatrick | 260—485G |
| 3,370,056 | 2/1968 | Yotsuzuka et al. | 260—615B |
| 3,381,022 | 4/1968 | Le Suer | 260—485G |

CHARLES B. PARKER, Primary Examiner

E. J. SKELLY, Assistant Examiner

U.S. Cl. X.R.

252—356; 424—61, 63, 70, 365